B. M. W. HANSON.
METAL WORKING MACHINE.
APPLICATION FILED JULY 17, 1919.
1,355,142.
Patented Oct. 12, 1920.
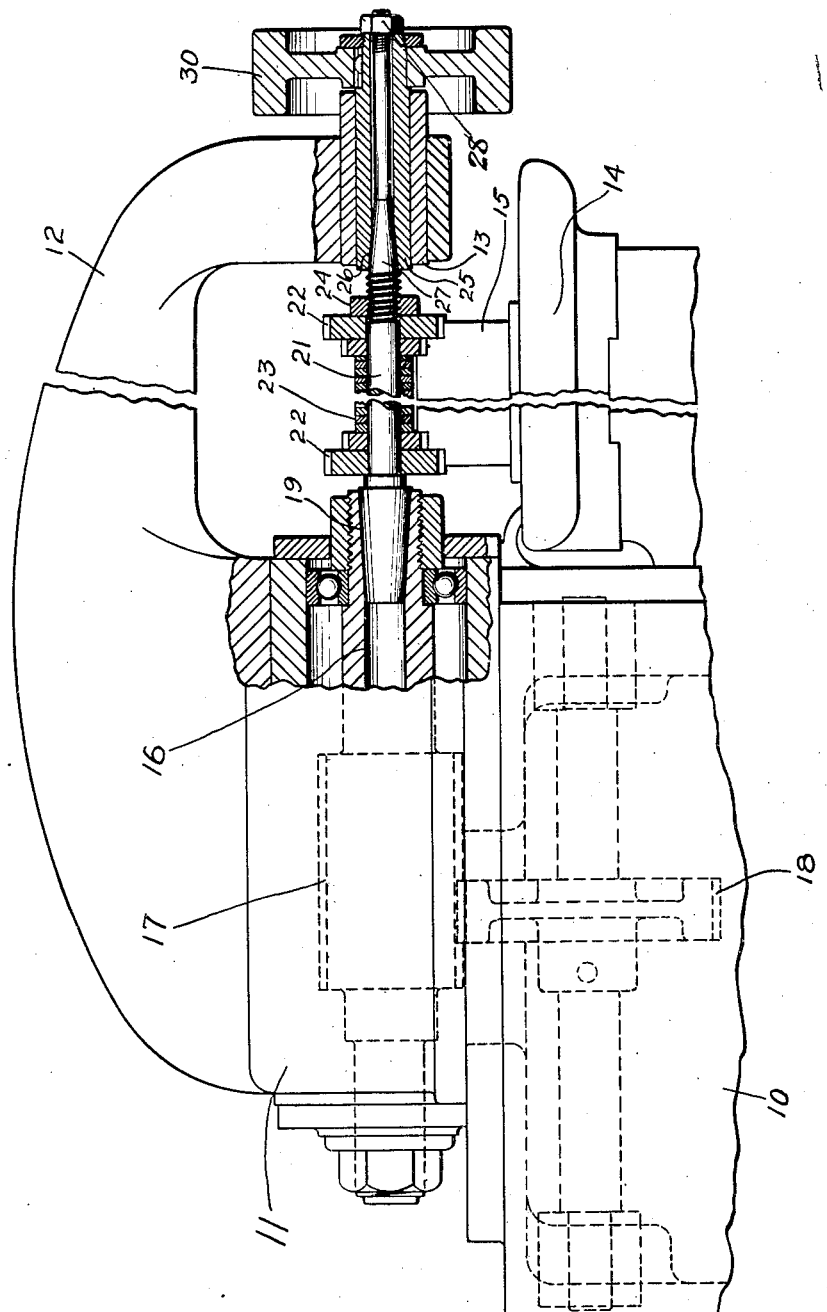
INVENTOR.
Bengt M. W. Hanson
BY
H. E. Hart
his ATTORNEY.

UNITED STATES PATENT OFFICE.

BENGT M. W. HANSON, OF HARTFORD, CONNECTICUT.

METAL-WORKING MACHINE.

1,355,142.   Specification of Letters Patent.   Patented Oct. 12, 1920.

Application filed July 17, 1919. Serial No. 311,546.

*To all whom it may concern:*

Be it known that I, BENGT M. W. HANSON, a citizen of the United States, and a resident of Hartford, county of Hartford, State of Connecticut, have invented certain new and useful Improvements in Metal-Working Machines, of which the following is a specification.

It is well known that in metal-working machines of the type having a rotating tool arbor, such for instance as a milling machine, the resistance offered to the tool, such as a milling cutter, results in twisting or winding up of the tool arbor or stem and then, due to the torque set up, the arbor suddenly unwraps causing the tool to hammer or chatter against the work. This is objectionable, not only in that the noisy chatter of the tool is annoying, but it results in damage to the cutter, in imperfect work and in noisy and faulty operation of the driving connections.

It has been proposed to employ on the spindle carrying the tool arbor, a fly-wheel for the purpose of reducing the noise of the spindle caused by chattering of the cutter, and particularly to prevent backlash in the driving connection, such as between the teeth on the spindle pinion and a gear meshing therewith, but while a fly-wheel mounted upon the spindle is of advantage in that it reduces the noise of the spindle, it is intended to take care of only one objection incident to faulty operation of the tool, and does not correct the trouble at its source, that is, it does not prevent twisting of the arbor and chattering of the tool.

It is an object of the present invention to prevent chattering of the tool or cutter of a metal working machine and thus entirely eliminate all the objections attendant thereto, and to this end I provide on the arbor (preferably at that side of the cutter opposite to the spindle) a fly-wheel which secures uniform rotation of the arbor so that the cutter thereon will run smoothly.

In describing the invention herein illustrated, the conventional terms will be used but it is to be understood that they are used solely for the purpose of description and they are not to be taken as having any limiting effect. For instance, I employ the word "spindle" to describe generally the driven member which carries the arbor on which is mounted the tool; the word "arbor" to denote the part carrying the tool; and the word "cutter" to describe generally the member or tool operating directly on the work.

In the accompanying drawing, the figure, partly in elevation and partly in section, illustrates one embodiment of my invention applied to a milling machine, only so much of the milling machine being illustrated as is necessary to fully understand the operation of my invention.

My invention has particular adaptability to a milling machine, but in the drawing portions of the milling machine are shown more or less diagrammatically or conventionally as the particular construction thereof forms no part of the present invention. The numeral 10 designates the bed of a milling machine; 11, a head-stock adapted to move in suitable guides on the head 10; 12, an overhanging arm suitably carried by the head-stock and having at its outer end a bearing provided with a liner 13; and 14, the work support to which is secured, in any suitable manner, the work operated upon and designated by the numeral 15. Carried by suitable bearings in the head-stock 11 is a spindle 16 provided intermediate its ends with a pinion 17 with which meshes a drive gear 18 carried by a shaft located in the bed 10. The spindle 16 is in axial alinement with the bearing liner 13 and has, at its forward end, a socket 19 in which is adapted to be fitted the tapering stem of the arbor 21.

The arbor 21 is of such length that it extends through and beyond the bearing liner 13, the bearing being divided longitudinally to permit putting the arbor in place. Secured to the arbor between the spindle and the bearing liner 13 are one or more cutters 22 and while, of course, the number, construction and arrangement of these cutters and the manner in which they are secured to the arbor may be varied, I have shown in the present instance two sets of cutters, each adapted to cut stepped recesses in the corners of the work 15. The cutters are spaced by suitable washers 23, and a nut 24 secures the parts against displacement. Within the bearing liner 13 is rotatably mounted an arbor sleeve 25 having a through opening receiving the outer end of the arbor. The sleeve 25 has a tapering socket 26 wedged onto the intermediate tapered portion 27 of the arbor so that the arbor and sleeve will rotate in unison. The sleeve 25 is held against displacement by a nut 28 screwed on the outer end of the arbor.

Keyed to the outer end of the arbor sleeve 25 is the fly-wheel 30. It is, of course, evident that the fly-wheel may be directly secured to the arbor, the essential point being that this fly-wheel is carried by the arbor in the sense that it is secured either directly to the arbor or to a part carried by and rotating with the arbor so that the arbor and fly-wheel rotate in unison.

The fly-wheel 30, due to its inertia, prevents the arbor, when the cutter or cutters are operating upon the work 15, from twisting or winding up and then suddenly jumping forwardly, and thus chattering of the cutters, together with all the annoying and injurious effects thereof, is entirely eliminated.

It is of course obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. In a machine of the character described, a tool arbor, a tool thereon, means for rotating the same, and a fly-wheel carried by the arbor, said tool and fly wheel being located to the same side of said rotating means.

2. In a machine of the character described, a tool arbor, a tool thereon, means for rotating the same, and a fly-wheel carried by the arbor at a distance from said rotating means, said tool and fly wheel being located to the same side of said rotating means.

3. In a machine of the character described, an arbor, a tool on the arbor, means for rotating the arbor, and a fly-wheel carried by the arbor at that side of the tool opposite to the rotating means.

4. In a machine of the character described, a tool arbor, driving means to which one end of said arbor is connected, and a fly-wheel on the other end of said arbor.

5. In a machine of the character described, a rotating spindle, a tool arbor one end of which is connected to said spindle, and a fly-wheel on the other end of said arbor.

6. In a machine of the character described, a rotating spindle, means for rotating the same, a bearing alined with said spindle, a tool arbor secured at one end of said spindle and supported by said bearing, a tool thereon and a fly-wheel carried by the arbor at a distance from said spindle, said tool and fly wheel being located to the same side of said rotating means.

7. In a machine of the character described, a rotating spindle, a bearing alined with said spindle, an arbor secured at one end to said spindle and supported by said bearing, a tool on the arbor between the spindle and bearing, and a fly-wheel carried by the arbor at a point beyond said bearing.

8. In a machine of the character described, a rotating spindle, a bearing alined with said spindle, a tool arbor secured to said spindle and extending through and beyond said bearing, and a fly-wheel carried by that end of said arbor which extends beyond said bearing.

9. In a machine of the character described, a rotating spindle, a bearing alined with said spindle, an arbor sleeve rotatably mounted in said bearing, an arbor secured at one end to said spindle and passing through and connected to said arbor sleeve so that the sleeve and arbor will rotate in unison, a tool on the arbor between said spindle and sleeve, and a fly-wheel carried by said sleeve.

BENGT M. W. HANSON.